US007693102B2

(12) United States Patent
Hayashi (10) Patent No.: US 7,693,102 B2
(45) Date of Patent: Apr. 6, 2010

(54) COMMUNICATION SYSTEM, METHOD THEREOF, SWITCHING CENTER THEREOF AND BASE STATION CONTROL STATION THEREOF

(75) Inventor: Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1436 days.

(21) Appl. No.: 10/344,360

(22) PCT Filed: Aug. 10, 2001

(86) PCT No.: PCT/JP01/06932

§ 371 (c)(1),
(2), (4) Date: Sep. 30, 2003

(87) PCT Pub. No.: WO02/15629

PCT Pub. Date: Feb. 21, 2002

(65) Prior Publication Data

US 2004/0063448 A1 Apr. 1, 2004

(30) Foreign Application Priority Data

Aug. 11, 2000 (JP) ............................. 2000-243529

(51) Int. Cl.
*H04W 4/00* (2009.01)
(52) U.S. Cl. .................. 370/329; 370/236; 370/252
(58) Field of Classification Search .................. 370/230, 370/236, 236.1, 328, 329, 335, 342, 395.2, 370/395.21, 455
See application file for complete search history.

(56) References Cited

U.S. PATENT DOCUMENTS

| 5,638,412 | A | 6/1997 | Blakeney, II et al. |
| 5,745,480 | A | 4/1998 | Behtash et al. |
| 5,818,871 | A | 10/1998 | Blakeney, II et al. |

(Continued)

FOREIGN PATENT DOCUMENTS

CA 2 273 981 6/1999

(Continued)

*Primary Examiner*—Ricky Ngo
*Assistant Examiner*—Gary Mui
(74) *Attorney, Agent, or Firm*—Young & Thompson (57) ABSTRACT

A WCDMA communication system that enables smooth data transmission although a communication rate corresponding to a communication service desired by a user can not be ensured due to lack of resources. If the desired communication rate can not be ensured due to lack of resources, instead of an alternative lower communication rate which is compulsorily set to by the base station control station (2-1, 2-2), the communication rate for actually effecting a data communication is negotiated between a switching center (1) and the base station control stations (2-1, 2-2), only when it is possible to provide a service at a communication rate lower than the requested communication rate. As one method of this, an indicator that indicates whether the communication rate can be negotiated or not is provided in a RAB assignment request to be transmitted from the switching center (1) to the base station control stations (2-1, 2-2). Only when this indicator indicates passable, the base station control stations (2-2, 2-2) decide, in the case of lack of resources, a communication rate lower than the desired communication rate, and transmit to the switching center (1) a RAB assignment response containing this decided communication rate. The communication service for a user terminal (4) is started in accordance with this communication rate.

74 Claims, 8 Drawing Sheets

U.S. PATENT DOCUMENTS

| | | | |
|---|---|---|---|
| 5,910,959 A * | 6/1999 | Olafsson et al. | 714/752 |
| 5,974,106 A | 10/1999 | Dupont et al. | |
| 6,072,787 A | 6/2000 | Hamalainen et al. | |
| 6,122,291 A * | 9/2000 | Robinson et al. | 370/468 |
| 6,240,079 B1 * | 5/2001 | Hamalainen et al. | 370/337 |
| 6,567,420 B1 * | 5/2003 | Tiedemann et al. | 370/468 |
| 6,745,049 B1 * | 6/2004 | Uchida et al. | 455/560 |
| 6,760,576 B2 * | 7/2004 | Chen | 455/266 |
| 6,888,794 B1 * | 5/2005 | Jovanovic et al. | 370/230 |
| 6,888,795 B2 * | 5/2005 | Gupta et al. | 370/230 |
| 6,944,473 B2 * | 9/2005 | Irwin et al. | 455/550.1 |
| 7,006,490 B2 * | 2/2006 | Hagirahim | 370/352 |
| 7,120,115 B1 * | 10/2006 | Laaksonen | 370/230 |
| 7,180,879 B2 * | 2/2007 | Sinnarajah et al. | 370/335 |
| 2001/0055298 A1 * | 12/2001 | Baker et al. | 370/349 |
| 2001/0055971 A1 * | 12/2001 | Irwin et al. | 455/450 |
| 2002/0077105 A1 * | 6/2002 | Chang | 455/436 |
| 2002/0150092 A1 * | 10/2002 | Bontempi et al. | 370/389 |
| 2003/0161325 A1 * | 8/2003 | Kekki | 370/395.43 |

FOREIGN PATENT DOCUMENTS

| | | |
|---|---|---|
| JP | 9-135202 | 5/1997 |
| JP | 10-276468 | 10/1998 |
| JP | 11-150761 | 6/1999 |
| JP | 11-234737 | 8/1999 |
| JP | 2000-217159 | 8/2000 |
| WO | WO 96/10320 | 4/1996 |
| WO | WO99/30442 | 6/1999 |

* cited by examiner

| TYPE OF SERVICE | NEGOTIABLE/ UNNEGOTIABLE | NEGOTIABLE BIT RATE |
| --- | --- | --- |
| SERVICE 1 | NEGOTIABLE | FOUR STAGES OF 128, 64, 32, 16Kbps |
| SERVICE 2 | NEGOTIABLE | TWO STAGES OF 256 AND 128 Kbps |
| SERVICE 3 | UNNEGOTIABLE | — |
| SERVICE 4 | NEGOTIABLE | FOUR STAGES OF 64, 32, 16, 8Kbps |

| FIRST STAGE | 128 Kbps |
|---|---|
| SECOND STAGE | 64 Kbps |
| THIRD STAGE | 32 Kbps |
| FOURTH STAGE | 16 Kbps |

COMMUNICATION SYSTEM, METHOD THEREOF, SWITCHING CENTER THEREOF AND BASE STATION CONTROL STATION THEREOF

TECHNICAL FIELD

The present invention relates to a communication system, a method thereof, a switching center thereof and base station control stations thereof, and in particular relates to a W-CDMA (Wide band Code Division Multiple Access) type communication system, including a plurality of base stations having cells serving as radio service areas, respectively, base station control stations for management and control of the base stations, and a switching center having a switching function for the base station control stations and a communication network.

BACKGROUND ART

Figure 1:
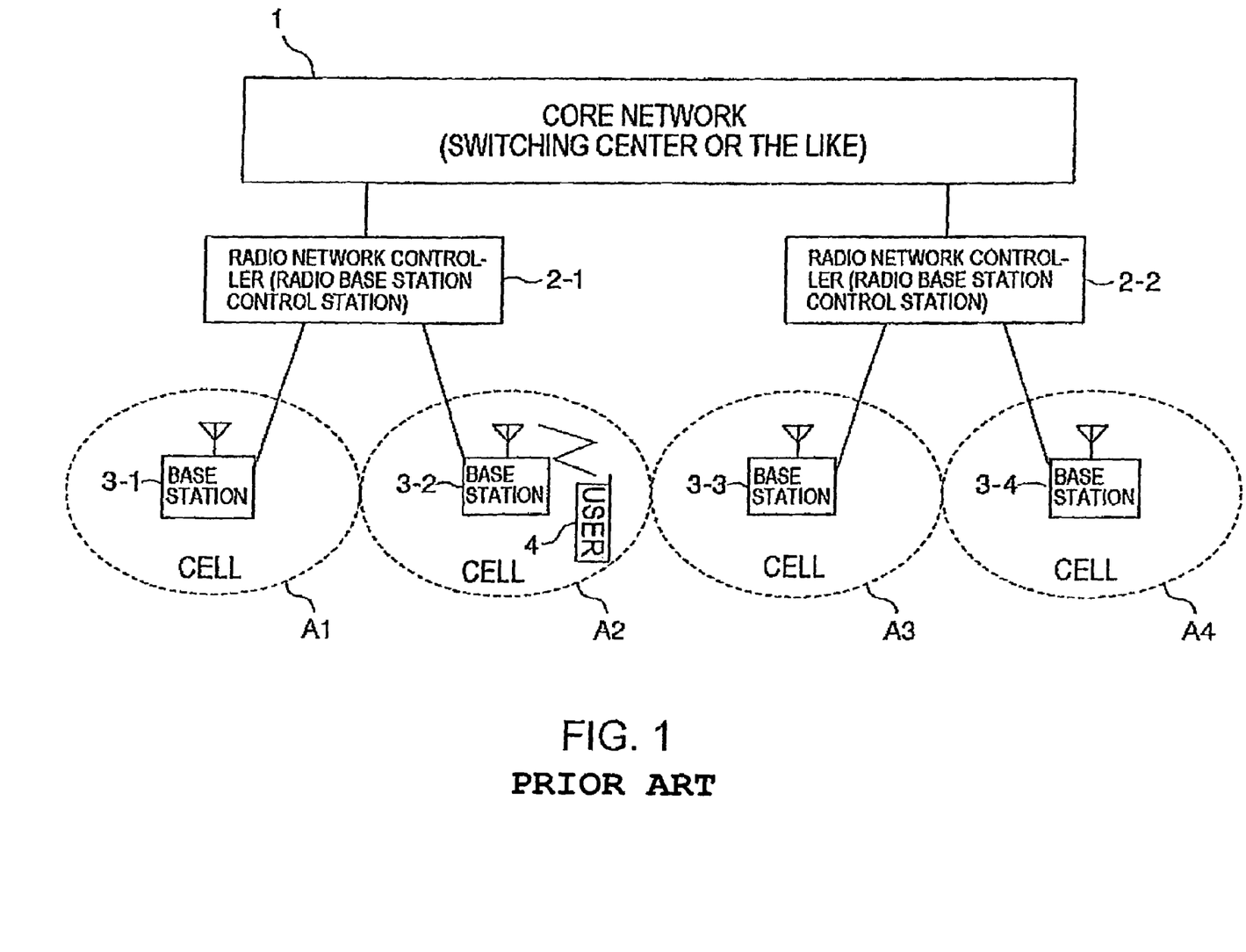
FIG. 1 is a schematic block diagram of a communication system to which embodiments of the present invention are applied.

Referring to FIG. 1, a communication system of this type will be described. FIG. 1 is a schematic block diagram showing the conceptual system configuration of the communication system of this type.

The illustrated communication system comprises first through fourth base stations 3-1, 3-2, 3-3, and 3-4, and these first through fourth base stations 3-1 to 3-4 have, as subordinates of them, first through fourth cells A1, A2, A3, and A4 serving as radio service areas, respectively.

In the example being illustrated, the first and the second base stations 3-1 and 3-2 are managed and controlled by a first radio network controller (RNC) 2-1, and the third and the fourth base stations 3-3 and 3-4 are managed and controlled by a second radio network controller 2-2. These first and second radio network controllers 2-1 and 2-2 are generally referred to as radio base station control stations, and hereinafter referred to as base station control stations in the present specification.

These first and second base station control stations 2-1 and 2-2 are connected to a core network 1 which is put into a higher position, and this core network 1 is illustrated on the assumption that it even includes a communication network. The core network 1 performs processing such as line connecting and switching processing between the communication network and a user terminal 4 serving as a mobile station within the first through the fourth cells A1 to A4. In the example being illustrated, the user terminal 4 is positioned in the second cell A2. This core network 1 essentially has a function as a switching center, and is therefore hereinafter referred to as the switching center in the present specification.

Figure 2:
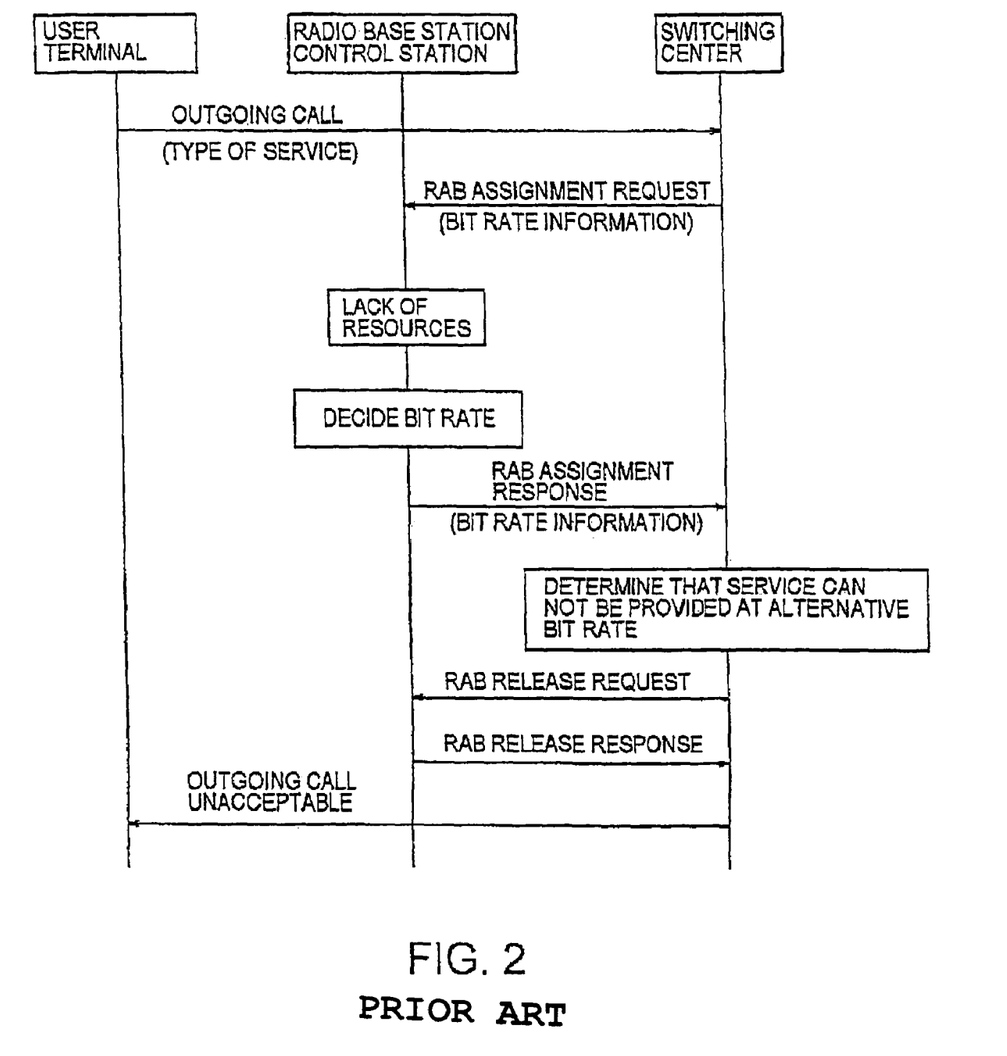
FIG. 2 is a sequence diagram showing an example of prior art operation.

FIG. 2 shows, in sequence, an example of operation in a case where a user wishes to enjoy some sort of a communication service by means of the user terminal 4, in the communication system shown in FIG. 1.

In this event, first, the user terminal 4 makes an outgoing call that includes information indicative of the type of the service in question. This outgoing call will be sent to the second base station 3-2, the first base station control station 2-1, and the switching center 1. Responsive to this outgoing call, the switching center 1 sends an RAB (Radio Access Bearer) assignment request message to the first base station control station 2-1. In this event, this RAB assignment request message contains requested bit rate information in accordance with the communication service requested by the user terminal.

Responsive to the RAB assignment request message containing the requested bit rate information, the first base station control station 2-1 determines the state of use of resources (lines) that it manages. This state of use is also the state of use of the recourses within the second cell A2 serving as the service area for the second base station 3-2. If the resource that satisfies this requested bit rate can be ensured, the first base station control station 2-1 determines that the communication service at this requested bit rate is possible. The first base station control station 2-1 then conveys this fact as a RAB assignment response message to the switching center 1. Responsive to this response massage, the switching center 1 regards the call from the user terminal 4 in question as successful, and starts the communication service at the requested bit rate in question.

On the other hand, the first base station control station 2-1 always monitors the state of use of the resources that it manages. When determining that it is impossible to assign a line that can satisfy the requested bit rate due to lack of resources, the first base station control station 2-1 conveys, as the RAB assignment response message to the switching center 1, the intention that it will substitute a bit rate lower than the requested bit rate. Responsive to this response massage, the switching center 1 performs the operation in one of the two cases described below. In a first case, the switching center 1 regards the call from the user terminal 4 in question as successful, and starts the communication service at the bit rate lower than the requested bit rate. In a second case, the switching center 1 determines that the bit rate is not the bit rate suitable for the communication service requested by the user terminal, and transmits a RAB release request message to the first base station control station 2-1. Then, in this event, the RAB release response message is sent from the base station control station, and the switching center regards the outgoing call as unacceptable.

It should be noted that the communication services that the user would enjoy include such services as an image data service including still images and moving images, and image voice data service in which voice is added to images.

It will be assumed that the communication service that the user intends to enjoy is such that requires a high bit rate as a service of the image data similar to real-time video data. In this event, when communication is carried out at a bit rate lower than that, the user terminal can not receive a necessary amount of data in a short time interval due to the lowered transmission rate. As a result, the images displayed on the actual user terminal would be unnatural.

Therefore, when the base station control station, of its own accord, decides a lower bit rate other than the desired bit rate designated from the switching center 1 to the base station control station as described above, there is a problem that smooth data transmission can not be achieved because the bit rate resource that the user satisfies can not be ensured.

In addition, it will be assumed that the switching center determines that it is impossible to provide the service at the lower bit rate decided by the base station control station of its own accord. In this event, the switching center 1 needs to transmit a release request message, as shown in FIG. 2, in order to release the resource held by the base station control station, it is therefore disadvantageous in that unnecessary signal processing is increased.

It is therefore an object of the present invention to provide a communication system, a method thereof, a switching center thereof and base station control stations thereof that enable smooth data transmission although a communication rate corresponding to a communication service desired by a user can not be ensured due to lack of resources.

It is a specific object of the present invention to provide a communication system, a method thereof, a switching center thereof and base station control stations thereof that enable smooth data transmission, not by compulsorily setting to a lower bit rate, but by negotiating the bit rate between the switching center and the base station control station only when it is possible to provide a service at a bit rate lower than the desired bit rate, in the case where the base station control station can not ensure the desired bit rate due to lack of resources.

DISCLOSURE OF THE INVENTION

According to the present invention, a communication system can be obtained which includes a plurality of base stations having cells serving as radio service areas, respectively, a plurality of base station control stations for managing and controlling the base stations, and a switching center having a switching function for said plurality of base station control stations and a communication network, and characterized in that said switching center comprises means for, when sending a line assignment request message to said base station control station in response to an outgoing call involving the type of a communication service from a user terminal lying in said cells, also sending communication rate information in accordance with the type of the communication service of said call and a negotiable indicator indicating whether this communication rate is negotiable or not.

Furthermore, it is characterized in that said base station control stations comprise means for determining, in response to said line assignment request message, a lack of lines on the basis of said communication rate information and the state of use in the lines that the base station control stations manage; and means for negotiating the communication rate for said communication service in accordance with the contents of said negotiable indicator in the case of the lack of lines.

Still further, it is characterized in that said base station control stations comprise means for deciding communication rate information other than the communication rate information corresponding to the type of the communication service of said call when said lack of lines is determined and said negotiable indicator indicates negotiable; and means for returning the decided communication rate information together with a response message to said switching center. In addition, it is characterized in that said base station control stations comprise means for returning to said switching center a response message indicating that said line assignment request is a failure when said lack of lines is determined and said negotiable indicator indicates unnegotiable.

According to the present invention, a communication system can be obtained which includes a plurality of base stations having cells serving as radio service areas, respectively, base station control stations for managing and controlling the base stations, and a switching center having a switching function for said base station control stations and a communication network, and characterized in that said switching center comprises means for, when sending a line assignment request message to said base station control station in response to an outgoing call involving the type of a communication service from a user terminal lying in said cells, sending not only desired communication rate information in accordance with the type of the communication service of said call but also negotiable communication rate information other than the desired communication rate.

Furthermore, it is characterized in that said base station control stations comprise means for determining, in response to said line assignment request message, a lack of lines on the basis of said desired communication rate information and the state of use of the lines that the base station control stations manage; and means for deciding one of said negotiable communication rate information as the communication rate for said communication service in the case of the lack of lines. In addition, it is characterized in that said base station control stations comprise means for returning this decided communication rate information together with a response message to said switching center.

Still further, it is characterized in that said switching center comprises means for initiating the communication service for said call in accordance with the communication rate information returned from said base station control station, and said adjustable communication rates are rates in a predetermined range lower than said desired communication rate. In addition, it is characterized in that said negotiable communication rates are a plurality of communication rates set in stages in said predetermined range.

Further yet, it is characterized in that said base station control stations further comprise means for returning to said switching center a response message indicating that said line assignment request is a failure when said lack of lines is determined and when said line assignment request message does not contain said negotiable communication rate information, and it is characterized in that said response message contains information indicating the lack of lines as the cause of the failure.

According to the present invention, a communication method can be obtained which includes a plurality of base stations having cells serving as radio service areas, respectively, base station control stations for managing and controlling the base stations, and a switching center having a switching function for said base station control stations and a communication network, and characterized in that said method includes the step of: also sending, in said switching center, when sending a line assignment request message to said base station control station in response to an outgoing call involving the type of a communication service from a user terminal lying in said cells, communication rate information in accordance with the type of the communication service of said call and a negotiable indicator indicating whether this communication rate is negotiable or not.

Furthermore, it is characterized in that in said base station control stations, including the steps of: determining, in response to said line assignment request message, a lack of lines on the basis of said communication rate information and the state of use of the lines that the base station control stations manage; and negotiating the communication rate for said communication service in accordance with the contents of said negotiable indicator in the case of the lack of lines. In addition, it is characterized in that in said base station control stations, including the steps of: deciding communication rate information other than the communication rate information corresponding to the type of the communication service of said call when said lack of lines is determined and when said negotiable indicator indicates negotiable; and returning the decided communication rate information together with a response message to said switching center.

Still further, it is characterized in that in said base station control stations, including the step of: returning to said switching center a response message indicating that said line assignment request is a failure when said lack of lines is determined and when said negotiable indicator indicates unnegotiable.

According to the present invention, a communication method can be obtained which includes a plurality of base stations having cells serving as radio service areas, respectively, base station control stations for managing and controlling the base stations, and a switching center having a switching function for said base station control stations and a communication network, and characterized in that in said switching center, including the step of: sending, when sending a line assignment request message to said base station control station in response to an outgoing call involving the type of a communication service from a user terminal lying in said cells, not only desired communication rate information in accordance with the type of the communication service of said call but also negotiable communication rate information other than the desired communication rate.

Furthermore, it is characterized in that in said base station control stations, including the steps of: determining, in response to said line assignment request message, a lack of lines on the basis of said desired communication rate information and the state of use in the lines that the base station control stations manage; and deciding one of said negotiable communication rate information as the communication rate for said communication service in the case of the lack of lines.

Still further, it is characterized in that in said base station control stations, including the step of; returning this decided communication rate information together with a response message to said switching center, and it is characterized in that in said switching center, including the step of: initiating the communication service for said call in accordance with the communication rate information returned from said base station control station. In addition, it is characterized in that said negotiable communication rates are rates in a predetermined range lower than said desired communication rate, and it is characterized in that said negotiable communication rates are a plurality of communication rates set in stages in said predetermined range.

According to the present invention, a switching center can be obtained which is in a communication system including a plurality of base stations having cells serving as radio service areas, respectively, base station control stations for managing and controlling the base stations, and the switching center having a switching function for said base station control stations and a communication network, and characterized in that said switching center comprises: means for, when sending a line assignment request message to said base station control stations in response to an outgoing call involving the type of a communication service from a user terminal lying in said cells, also sending communication rate information in accordance with the type of the communication service of said call and a negotiable indicator indicating whether this communication rate is negotiable or not.

According to the present invention, a switching center can be obtained which in a communication system including a plurality of base stations having cells serving as radio service areas, respectively, base station control stations for managing and controlling the base stations, and the switching center having a switching function for said base station control stations and a communication network, and characterized in that said switching center comprises: means for, when sending a line assignment request message to said base station control stations in response to an outgoing call involving the type of a communication service from a user terminal lying in said cells, sending not only desired communication rate information in accordance with the type of the communication service of said call but also negotiable communication rate information other than the desired communication rate.

According to the present invention, a base station control station can be obtained which in a communication system including a plurality of base stations having cells serving as radio service areas, respectively, the base station control stations for managing and controlling the base stations, and a switching center having a switching function for said base station control stations and a communication network, and characterized in that said base station control station comprises: means for receiving communication rate information in accordance with the type of a communication service of a call contained in a line assignment request message and a negotiable indicator indicating whether this communication rate is negotiable or not that are sent from said switching center in response to an outgoing call involving the type of the communication service from a user terminal lying in said cells; means for determining a lack of lines on the basis of said communication rate information and the state of use of the lines that the base station control stations manage; and means for negotiating the communication rate for said communication service in accordance with the contents of said negotiable indicator in the case of the lack of lines.

Furthermore, it is characterized in that said base station control station comprises: means for deciding communication rate information other than the communication rate information corresponding to the type of the communication service of said call when said lack of lines is determined and said negotiable indicator indicates negotiable; and means for returning the decided communication rate information together with a response message to said switching center, and it is also characterized in that comprises means for returning to said switching center a response message indicating that said line assignment request is a failure, when said lack of lines is determined and said negotiable indicator indicates unnegotiable.

According to the present invention, a base station control station can be obtained which in a communication system including a plurality of base stations having cells serving as radio service areas, respectively, the base station control stations for managing and controlling the base stations, and the switching center having a switching function for said base station control stations and a communication network, and characterized in that said base station control station comprises: means for receiving desired communication rate information in accordance with the type of a communication service of a call contained in a line assignment request message and negotiable communication rates other than the desired communication rate that are sent from said switching center in response to the call involving the type of the communication service from a user terminal lying in said cells; means for determining a lack of lines on the basis of said desired communication rate information and the state of use of the lines that the base station control stations manage; and means for deciding one of said negotiable communication rate information as the communication rate for said communication service in the case of the lack of lines. In addition, it is characterized in that the base station control station can be obtained which further comprises means for returning this decided communication rate information together with a response message to said switching center.

According to the present invention, a communication system can be obtained which includes a plurality of base stations having cells serving as radio service areas, respectively, base station control stations for managing and controlling the base stations, and a switching center having a switching function for said base station control stations and a communication network, and characterized in that said switching center comprises means for sending, in response to an outgoing call involving the type of a communication service from a user terminal lying in said cells, a line assignment request message containing communication rate information in accordance with the type of said communication service to said base station control stations; and said base station control stations comprising means for determining whether said communication rate is negotiable or not on the basis of information in said line assignment request message.

Furthermore, it is characterized in that the information in said line assignment request message is an option parameter of the line assignment request message. In addition, it is characterized in that said determining means of said base station control stations determine that said communication rate Is negotiable when said option parameter is present or said communication rate is not negotiable when said option parameter is not present.

Now, the function of the present invention will be described. In the present invention, if a desired communication rate can not be ensured due to lack of resources, instead of an alternative lower communication rate which is compulsorily set to by the base station control station, the communication rate for actually effecting a data communication is negotiated between the switching center and the base station control station, only when it is possible to provide a service at a communication rate lower than the requested communication rate.

As one concrete method of this, an indicator that indicates whether the communication rate can be negotiated or not is provided in an RAB assignment request (line assignment request) message to be transmitted from the switching center to the base station control station. Only when the indicator indicates passable, the base station control station decides, in the case of lack of resources, a communication rate lower than the desired communication rate, and transmits to the switching center an RAB assignment response message containing this communication rate. The communication service for the user terminal is started in accordance with this communication rate.

In another method, if a service allows the communication rate to be negotiated, negotiable communication rates are also contained in addition to the desired communication rate in an RAB assignment request (line assignment request) message to be transmitted from the switching center to the base station control station. Only when these negotiable communication rates are contained, the base station control station decides so as to use the negotiable communication rate in the case of lack of resources and transmits to the switching center a RAB assignment response message containing these communication rates. The communication service for the user terminal is started in accordance with this communication rate.

BEST MODE FOR EMBODYING THE INVENTION

The invention will be described in more detail in conjunction with the accompanying drawings.

A system configuration of FIG. 2 previously referred to can directly be applied also to embodiments of the present invention.

Figure 3:
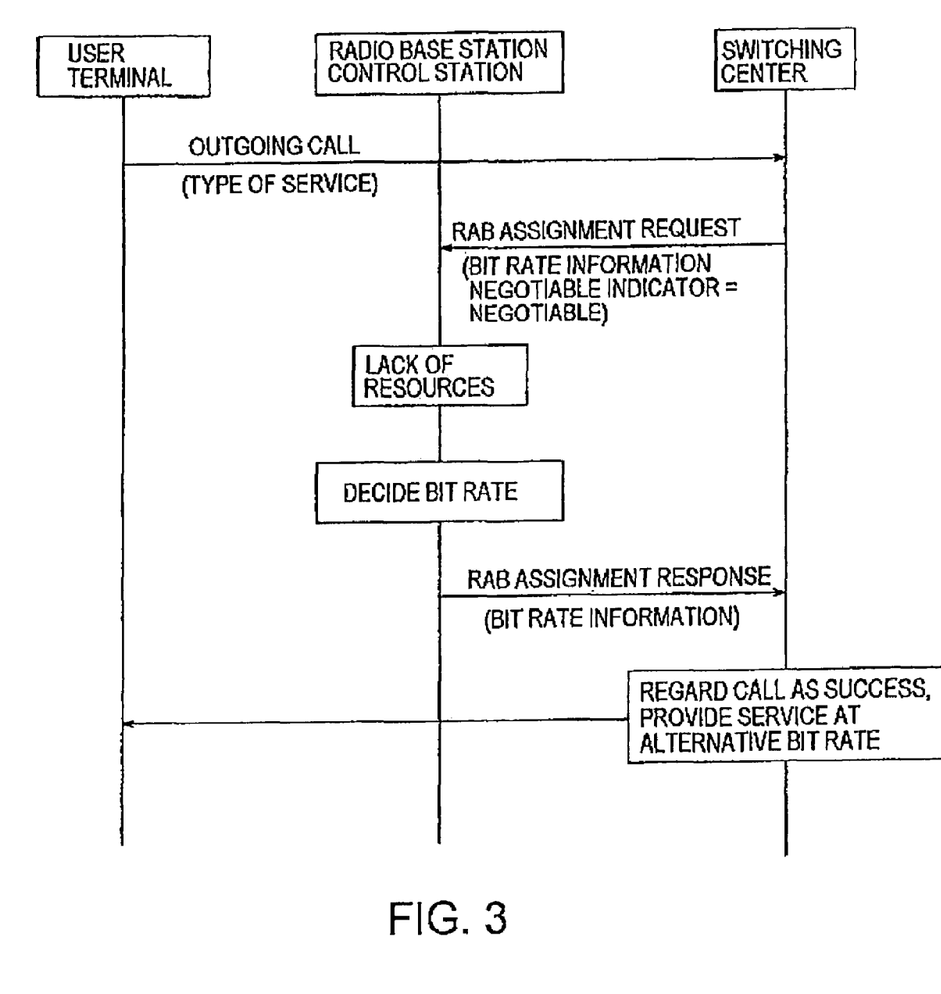
FIG. 3 is a sequence diagram showing the operation in the case where a negotiable indicator, that indicates whether a bit rate can be negotiated or not, indicates "Negotiable", in one embodiment of the present invention.

FIG. 3 is a sequence diagram showing an operation procedure among a user terminal 4, a first radio base station control station 2-1, and a switching center 1 that are shown in FIG. 1, and illustrates one embodiment of the present invention. In FIG. 3, it is assumed that when an outgoing call request is made from the user terminal 4, this outgoing call request contains the type of a communication service of a service that a user tries to enjoy. This outgoing call request is sent to the switching center 1 via a second base station 3-2 that designates a second cell A2 to which the user terminal 4 belongs as a service area and via the first base station control station 2-1.

Responsive to this outgoing call request, the switching center 1 sends an RAB assignment request message serving as a line assignment request to the first base station control station 2-1. This message in this context contains bit rate information (requested bit rate information) in accordance with the type of the communication service that the user intends to enjoy, and a negotiable indicator that indicates whether this requested bit rate information can be negotiated or not.

Figure 4:
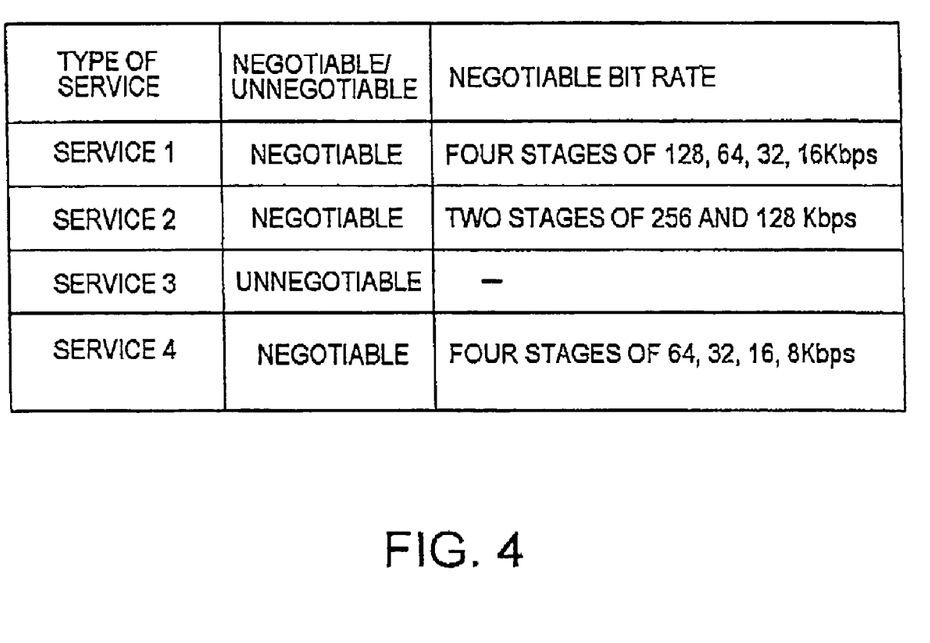
FIG. 4 is a diagram showing whether bit rates can be negotiated or not in association with the type of service, and negotiable bit rates when they can be negotiated, in the embodiment of the present invention.

Here, the switching center 1 has stored in advance, for example, a table such as one shown in FIG. 4 in a memory, in association with the type of the communication service that the user would try to enjoy. In FIG. 4, bit rates can be negotiated in services 1, 2, and 4, whereas bit rates can not be negotiated in a service 3. In accordance with this table, the switching center 1 determines whether the bit rate for the service that the user intends to enjoy can be negotiated or not. For example, in the case of the service 1, a flag "1" indicating negotiable is displayed in the negotiable indicator.

Responsive to this RAB assignment request message, the first base station control station 2-1 determines, referring to a desired bit rate contained therein, whether a lack of resources is caused from the state of use of the resources (lines) that it manages (i.e., the current state of use in the resources within the second cell A2 of the second base station 3-2). Inasmuch as the negotiable indicator is set to "1" when the lack of resources is determined, the first base station control station 2-1 decides a bit rate which is lower than the requested bit rate and which is in the range of resources capable of being set in the first base station control station 2-1. The first base station control station 2-1 then sets this decided bit rate information in a RAB assignment response message to return it to the switching center 1.

Note that the base station control station always manages the state of resources used by the base stations under it. As to a management method thereof, by use of the management table of the resources, management and control are performed on the basis of this management table. In this way, inasmuch as some of them can use the known management and control method, the description thereof will not be omitted here.

Responsive to an RAB assignment response message in which a bit rate other than the requested bit rate set in the RAB assignment request message is set, the switching center 1 will provide a service to the user at that set bit rate, resulting in the success of the call.

Figure 5:
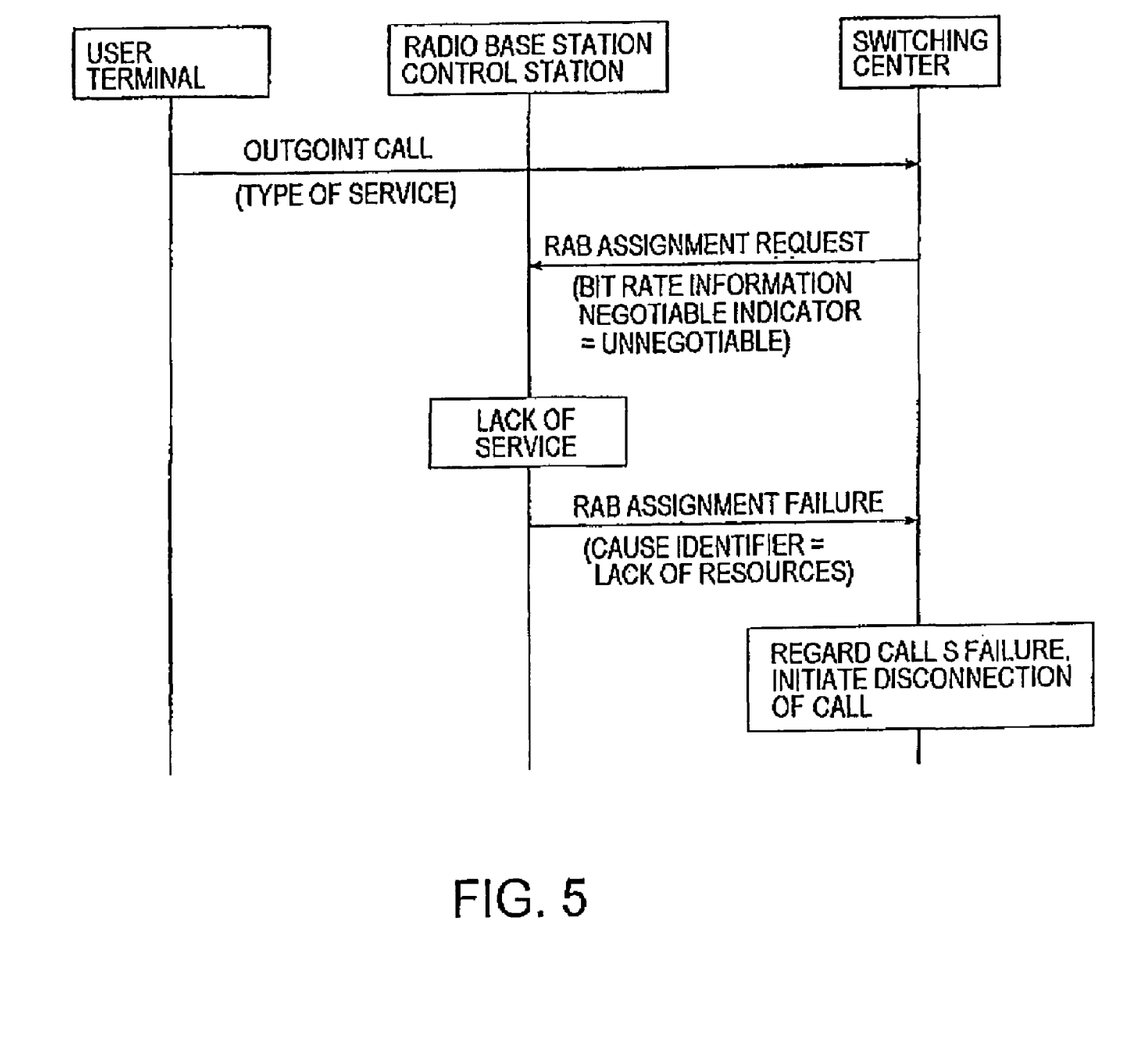
FIG. 5 is a sequence diagram showing the operation in the case where the negotiable indicator, that indicates whether a bit rate can be negotiated or not, indicates "Not Negotiable", in one embodiment of the present invention.

It will be assumed that the negotiable indicator of the RAB assignment request message is set to "0" (i.e., set to Not Negotiable), as shown in the sequence diagram of FIG. 5. In this event, a RAB assignment failure message, to which a cause identifier indicating the lack of resources is attached, is returned from the first base station control station 2-1 to the switching center 1. Responsive to this RAB assignment failure message, the switching center 1 determines that this service can not be provided and treats this call as a failure, and then initiates a disconnection of the call.

It will be assumed that it is determined that the first base station control station 2-1 is not causing a lack of resources but is capable of providing the service at the requested bit rate, in the sequences of FIGS. 3 and 5. In this event, the service is provided at this requested bit rate, so that the call is of course successful in this case.

Figure 6:
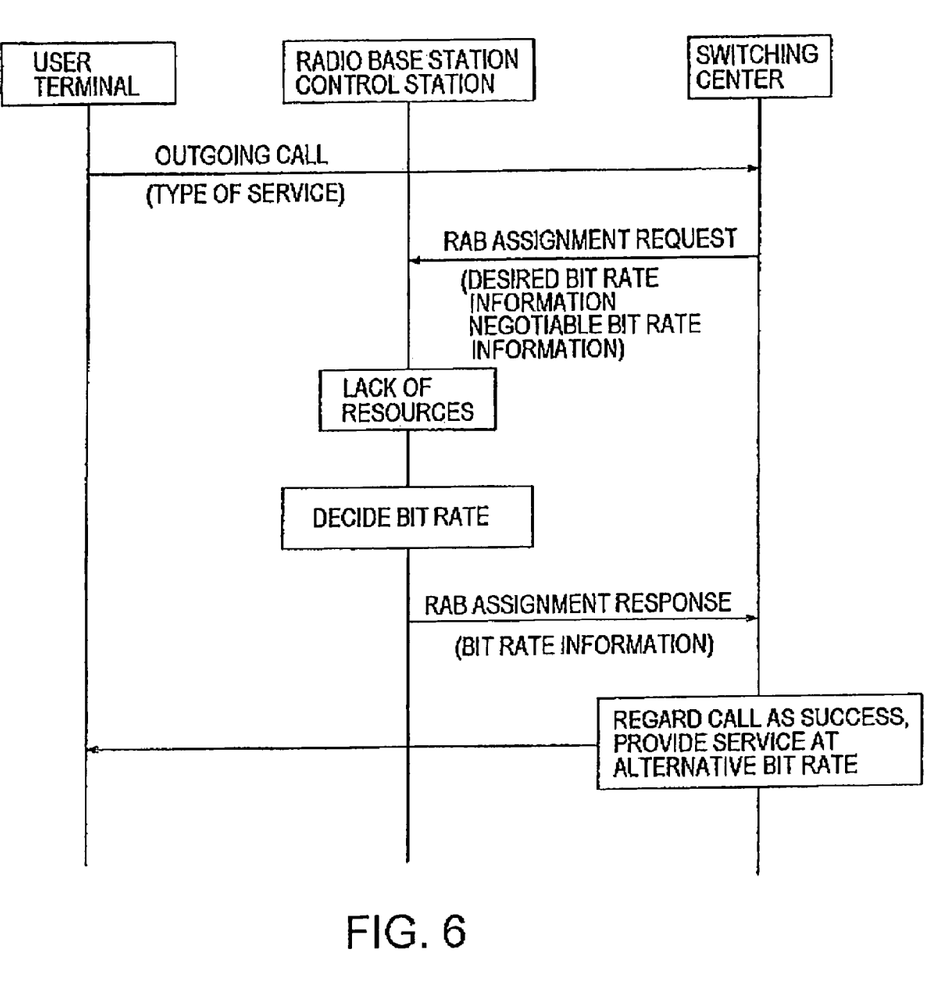
FIG. 6 is a sequence diagram showing the operation in the case where negotiable bit rate information is set, in another embodiment of the present invention.

FIG. 6 is a sequence diagram of another embodiment of the present invention. In FIG. 6, it is assumed that when an outgoing call request is made from the user terminal 4, this outgoing call request contains the type of the communication service of a service that the user tries to enjoy. This outgoing call request is sent to the switching center 1 via the second base station 3-2 that designates the second cell A2 to which the user terminal 4 belongs as a service area and via the first base station control station 2-1.

Responsive to this outgoing call request, the switching center 1 sends an RAB assignment request message to the first base station control station 2-1. This message in this context contains the bit rate information (desired bit rate information) in accordance with the type of the communication service that the user intends to enjoy, and the negotiable bit rate information prescribed by the type of the service shown in FIG. 4 in the case where the desired bit rate information is negotiable.

Figure 7:
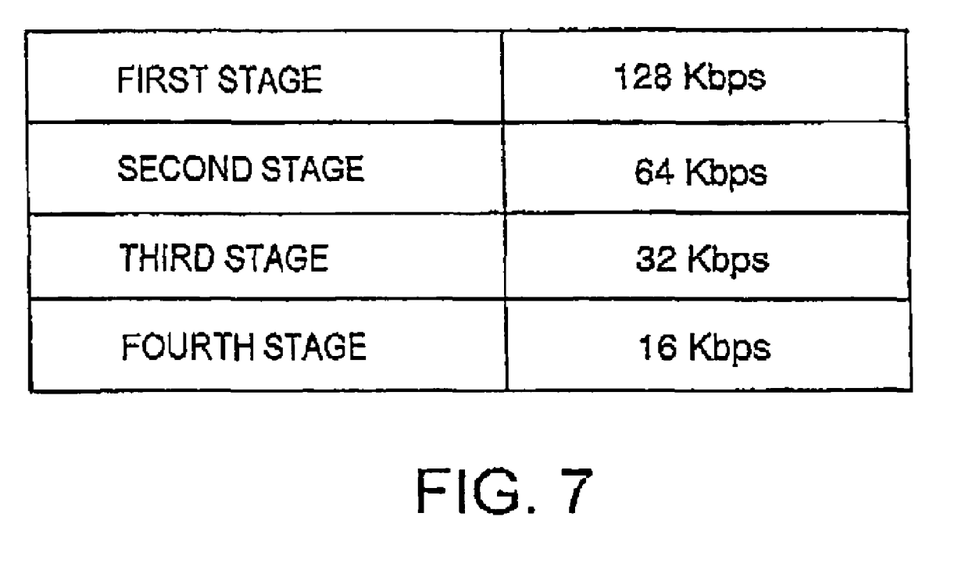
FIG. 7 is a diagram showing an example of the negotiable bit rate information of FIG. 5.

As an example of this negotiable bit rate information, bit rates of a plurality of stages lower than the desired bit rate are decided in advance, as shown in FIG. 4. More specifically, the service 1 has four stages of 128 to 16 kbps, the service 2 has two stages of 256 and 128 kbps, and the service 4 has four stages of 64, 32, 16, and 8 kbps. In the case of lack of resources, setting of a bit rate one stage lower than the desired bit rate (maximum bit rate) is tried. For instance, in the case of the service 1, the desired bit rate is 128 kbps as shown in FIG. 7. When a resource that can provide at 128 kbps can not be obtained, setting of a next-lower bit rate of 64 kbps is tried. Still in the case of lack of resources, setting of a still lower bit rate of 32 kbps is tried.

In this way, when it is determined that a resource that can provide can be obtained, the first base station control station 2-1 decides a bit rate, and sets the decided bit rate information in the RAB assignment response message to return it to the switching center 1. In accordance with this bit rate, the switching center 1 provides the service to the user, resulting in the success of the call.

Figure 8:
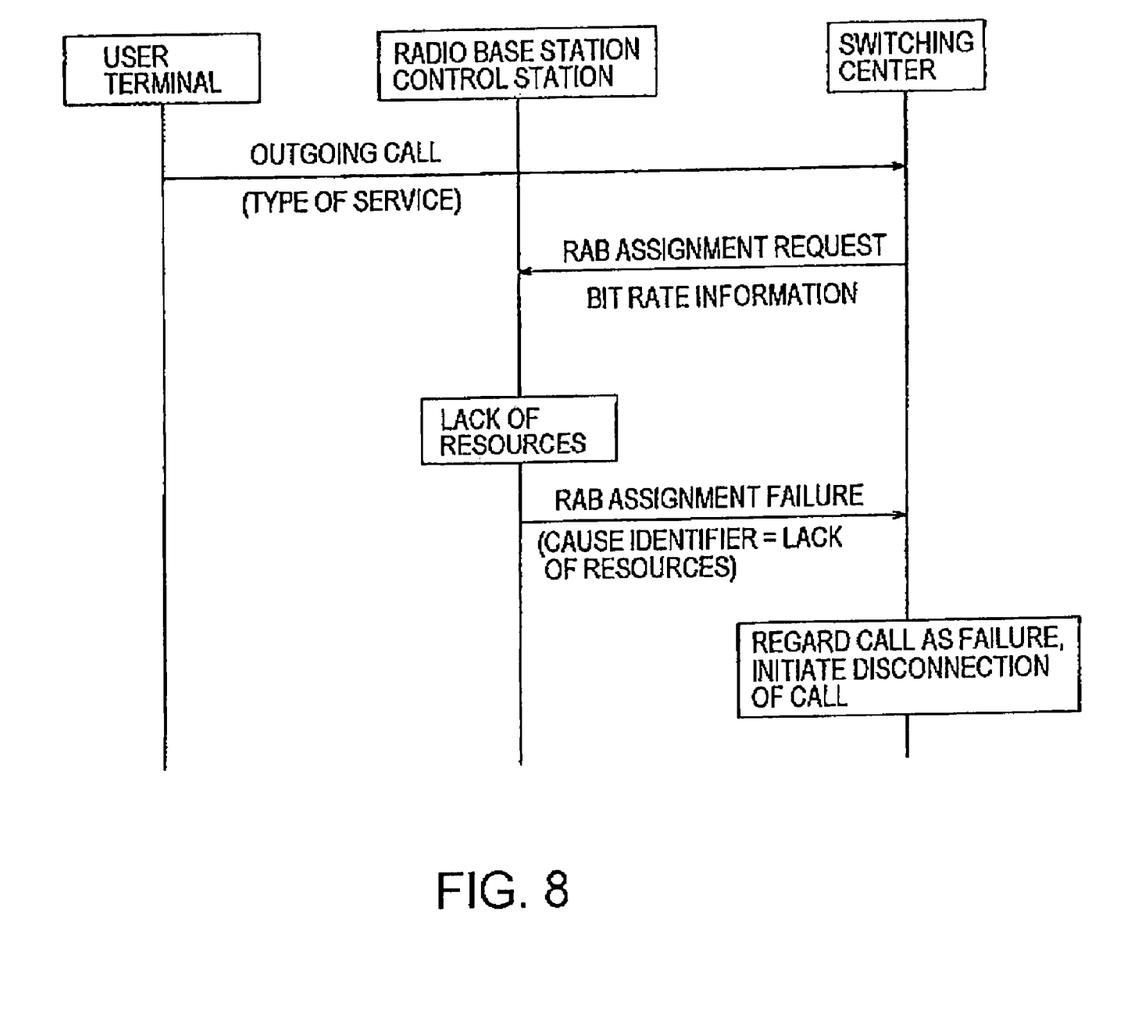
FIG. 8 is a sequence diagram showing the operation in the case where negotiable bit rate information is not set, in another embodiment of the present invention.

It will be assumed that no negotiable bit rate information is set in the RAB assignment request message, as shown in the sequence diagram of FIG. 8. Under the circumstances, in the case of lack of resources, the first base station control station 2-1 sets a cause identifier indicating the lack of resources to return an RAB assignment failure message to the switching center 1. The switching center 1 regards this call as a failure and initiates a disconnection of the call.

While the staged bit rates shown in FIGS. 4 and 7 are used as the negotiable bit rate information to be set in the RAB assignment request in the embodiment shown in FIG. 6, information indicating a negotiable range (upper limit and lower limit) is to be set, and in this negotiable range, the base station control station may decide a bit rate in the case of lack of resources.

Furthermore, it may set the negotiable indicator shown in FIG. 3 and the negotiable bit rate information shown in FIG. 6 by superposing them on a header part of the RAB assignment request message. In addition, with the negotiable bit rate information contained in the RAB assignment request message as an option parameter, it may determine that the bit rate is negotiable when the option parameter is present, and is not negotiable when the option parameter is not present. As a result, the switching center sends, in response to an outgoing call involving the type of a communication service from the user terminal lying in the above-mentioned cells, a line assignment request message that contains information indicating the communication rate information to the base station control station, and the base station control station can determine whether the communication rate is negotiable or not on the basis of the information of the option parameter in the line assignment request message, so that the negotiable indicator can be dispensed with.

It should be noted that functional block diagrams for the radio base station control stations and the switching center are not specifically shown, but as to the radio base station control stations, such a function may be added to the conventional function that takes in the negotiable indicators and the negotiable bit rate information to decide the bit rate in the case of lack of resources. It is apparent that this function can be facilitated simply with a CPU (operation processing controller of a computer or the like) by means of an operation control program previously stored in a storage medium such as a ROM.

Furthermore, as to the switching center, such a function may be added to the conventional function that determines the negotiable indicators and the negotiable bit rate information in accordance with the type of the service set in the outgoing call to add them into the RAB assignment request message. It is apparent that this function can also be facilitated with a CPU by means of an operation control program previously stored in a storage medium such as a ROM.

As described above, according to the present invention, a bit rate is negotiated between the switching center and the base station control station to provide a service only when it is possible to provide the service to the user at a bit rate lower than the requested bit rate, thus providing the advantage that smooth data transmission is possible. Conversely, when it is not possible to provide a service at a bit rate lower than the requested bit rate, the bit rate is not negotiated between the switching center and the base station control station and then the call is disconnected, thus also providing the advantage that unnecessary signal processing can be eliminated.

The invention claimed is:

1. A communication system, comprising:
   a user terminal,
   a plurality of base stations with cells serving as radio service areas, respectively,
   base station control stations, and
   a core network with a switching function, wherein said core network comprises means for, when sending a line assignment request message to said base station control station in response to a request from said user terminal present in said cells, sending first information about a communication rate and second information indicating whether the communication rate is negotiable,
   wherein the request is based on a requested type of communication service and a prestored table assigning communication rate negotiability to different types of communication services requested by the user terminal.

2. The communication system according to claim 1, wherein said base station control stations comprise means for determining, in response to said line assignment request message, a lack of lines on the basis of said first information and the state of use of the lines that the base station control stations manage; and means for negotiating the communication rate for the type of communication service in accordance with the contents of said second information in the case of the lack of lines.

3. The communication system according to claim 2, wherein said base station control stations comprise means for deciding communication rate information other than the first information corresponding to the type of the communication service of said request when said lack of lines is determined and when said second information indicates negotiable; and means for returning said decided communication rate information together with a response message to said core network.

4. The communication system according to claim 3, wherein said core network comprises means for initiating the communication service for said request in accordance with the communication rate information returned from said base station control station.

5. The communication system according to claim 2, wherein said base station control stations comprise means for returning to said core network a response message indicating that said line assignment request is a failure when said lack of lines is determined and said second information indicates unnegotiable.

6. The communication system according to claim 5, wherein said response message contains information indicating the lack of lines as the cause of the failure.

7. The communication system according to claim 1, wherein said first information includes a desired communication rate and said second information includes plural negotiable communication rates other than the desired communication rate.

8. The communication system according to claim 7, wherein said base station control stations comprise means for determining a lack of lines on the basis of said desired communication rate and the state of use of the lines that the base station control stations manage; and means for deciding one of said negotiable communication rates as the communication rate for the type of communication service in the case of the lack of lines.

9. The communication system according to claim 8, wherein said base station control stations comprise means for returning the decided communication rate information together with a response message to said core network.

10. The communication system according to claim 9, wherein said core network comprises means for initiating the communication service for said request in accordance with the communication rate information returned from said base station control station.

11. The communication system according to claim 9, wherein said negotiable communication rates are rates in a predetermined range lower than said desired communication rate.

12. The communication system according to claim 11, wherein said negotiable communication rates are a plurality of communication rates set in stages in said predetermined range.

13. The communication system according to claim 8, wherein said negotiable communication rates are rates in a predetermined range lower than said desired communication rate.

14. The communication system according to claim 13, wherein said negotiable communication rates are a plurality of communication rates set in stages in said predetermined range.

15. The communication system according to claim 8, wherein said base station control stations comprise means for returning to said core network a response message indicating that line assignment request is a failure when said lack of lines is determined and when said line assignment request message does no contain said second information.

16. The communication system according to claim 15, wherein said response message contains information indicating the lack of lines as the cause of the failure.

17. The communication system according to claim 7, wherein said negotiable communication rates are rates in a predetermined range lower than said desired communication rate.

18. The communication system according to claim 17, wherein said negotiable communication rates are a plurality of communication rates set in stages in said predetermined range.

19. The communication system according to claim 7, wherein said core network further comprises means for determining whether the communication rate is negotiable.

20. The communication system according to claim 1, wherein said core network further comprises means for determining whether the communication rate is negotiable.

21. A communication method for a communication system including a user terminal, a plurality of base stations with cells serving as radio service areas, respectively, base station control stations, and a core network with a switching function, said method comprising:
sending, in said core network, when sending a line assignment request message to said base station control station in response to a request from said user terminal present in said cells, first information about a communication rate and second information indicating whether the communication rate is negotiable,
wherein the request is based on a requested type of communication service and a prestored table assigning communication rate negotiability to different types of communication services requested by the user terminal.

22. The communication method according to claim 21, including:
determining, in said base station control stations, in response to said line assignment request message, a lack of lines on the basis of said first information and the state of use in the lines that the base station control stations manage; and
negotiating the communication rate for the type of communication service in accordance with the contents of said second information in the case of the lack of lines.

23. The communication method according to claim 22, including:
deciding, in said base station control stations, communication rate information other than the first information corresponding to the type of the communication service of said request when said lack of lines is determined and said second information indicates negotiable; and returning said decided communication rate information together with a response message to said core network.

24. The communication method according to claim 23, including:

initiating, in said core network, the communication service for said request, in accordance with the decided communication rate returned from said base station control station.

25. The communication method according to claim 22, including:
returning, in said base station control stations, to said core network a response message indicating that said line assignment request is a failure when said lack of lines is determined and said second information indicates unnegotiable.

26. The communication method according to claim 25, wherein said response message contains information indicative of the lack of lines as the cause of the failure.

27. The communication method according to claim 21, wherein said first information includes a desired communication rate and said second information includes plural negotiable communication rates other than the desired communication rate.

28. The communication method according to claim 27, including:
determining, in said base station control stations, in response to said line assignment request message, a lack of lines on the basis of said desired communication rate and the state of use of the lines that the base station control stations manage;
and deciding one of said negotiable communication rates as the communication rate for the type of communication service in the case of the lack of lines.

29. The communication method according to claim 28, including:
returning, in said base station control stations, the decided communication rate together with a response message to said core network.

30. The communication method according to claim 29, including:
initiating, in said core network, the type of communication service for said request, in accordance with the decided communication rate returned from said base station control station.

31. The communication method according to claim 29, wherein said negotiable communication rates are rates in a predetermined range lower than said desired communication rate.

32. The communication method according to claim 31, wherein said negotiable communication rates are a plurality of communication rates set in stages in said predetermined range.

33. The communication method according to claim 28, wherein said negotiable communication rates are rates in a predetermined range lower than said desired communication rate.

34. The communication method according to claim 33, wherein said negotiable communication rates are a plurality of communication rates set in stages in said predetermined range.

35. The communication method according to claim 28, including:
returning, in said base station control stations, to said core network a response message indicating that said line assignment request is a failure when said lack of lines is determined and said line assignment request message does not contain said second information.

36. The communication method according to claim 35, wherein said response message contains information indicative of the lack of lines as the cause of the failure.

37. The communication method according to claim 27, wherein said negotiable communication rates are rates in a predetermined range lower than said desired communication rate.

38. The communication method according to claim 37, wherein said negotiable communication rates are a plurality of communication rates set in stages in said predetermined range.

39. The communication method according to claim 27, further comprises determining, in said core network, whether said communication rate is negotiable.

40. The communication method according to claim 21, further comprising determining, in said core network, whether said communication rate is negotiable.

41. A core network with a switching function in a communication system including a user terminal, a plurality of base stations with cells serving as radio service areas, respectively, and base station control stations, said core network comprising:
first means for sending a line assignment request message to said base station control station in response to a request from said user terminal present in said cells, and
second means for sending first information about a communication rate and second information indicating whether the communication rate is negotiable, when said first means sends the line assignment request message,
wherein the request is based on a requested type of communication service and a prestored table assigning communication rate negotiability to different types of communication services requested by the user terminal.

42. The core network according to claim 41, wherein said first information includes a desired communication rate and said second information includes plural negotiable communication rates other than the desired communication rate.

43. The core network according to claim 42, further comprises third means for determining, in said core network, whether said communication rate is negotiable.

44. The core network according to claim 41, further comprising third means for determining, in said core network, whether said communication rate is negotiable.

45. A base station control station in a communication system including a user terminal, a plurality of base stations with cells serving as radio service areas, respectively, and a core network with a switching function, said base station control station comprising:
first means for receiving a line assignment request message from said core network in response to a request from the user terminal present in said cells, and
second means for receiving first information about a communication rate and second information indicating whether the communication rate is negotiable from said core network when said first means receives the line assignment request message,
wherein the request is based on a requested type of communication service and a prestored table assigning communication rate negotiability to different types of communication services requested by the user terminal.

46. The base station control station according to claim 45, further comprising:
means for deciding communication rate information other than the first information corresponding to the type of communication service of said request when a lack of lines is determined and said second information indicates negotiable; and means for returning said decided communication rate information together with a response message to said core network.

47. The base station control station according to claim 45, comprising means for returning to said core network a response message indicating that said line assignment request is a failure, when a lack of lines is determined and when said second information indicates unnegotiable.

48. The base station control station according to claim 47, wherein said response message contains information indicating the lack of lines as the cause of the failure.

49. The base station control station according to claim 45, wherein said first information includes a desired communication rate and said second information includes plural negotiable communication rates other than the desired communication rate.

50. The base station control station according to claim 49, further comprising means for returning a decided communication rate together with a response message to said core network.

51. The base station control station according to claim 50, wherein said negotiable communication rates are rates in a predetermined range lower than said desired communication rate.

52. The base station control station according to claim 50, wherein said negotiable communication rates are a plurality of communication rates set in stages in said predetermined range.

53. The base station control station according to claim 49, wherein said negotiable communication rates are rates in a predetermined range lower than said desired communication rate.

54. The base station control station according to claim 49, comprising means for returning to said core network a response message indicating that said line assignment request is a failure when a lack of lines is determined and when said line assignment request message does not contain said second information.

55. The base station control station according to claim 54, wherein said response message contains information indicating the lack of lines as the cause the failure.

56. The base station control station according to claim 49, wherein said core network determines whether said communication rate is negotiable.

57. The base station control station according to claim 45, wherein said core network determines whether said communication rate is negotiable.

58. A communication system comprising:
a user terminal,
a plurality of base stations with cells serving as radio service areas, respectively,
base station control stations, and
a core network with a switching function, wherein
said core network comprises means for sending, in response to a request from the user terminal present in said cells, a line assignment request message containing first information about a communication rate and second information indicating whether the communication rate is negotiable, to said base station control stations; and
said base station control stations comprising means for determining whether said communication rate is negotiable on the basis of information in said line assignment request message,
wherein the request is based on a requested type of communication service and a prestored table assigning communication rate negotiability to different types of communication services requested by the user terminal.

59. The communication system according to claim 58, wherein the information in said line assignment request message is an option parameter of the line assignment request message.

60. The communication system according to claim 59, wherein said determining means of said base station control stations determine that said communication rate is negotiable when said option parameter is present or that said communication rate is not negotiable when said option parameter is not present.

61. The communication system according to claim 59, wherein said line assignment request message is a RAB (Radio Access Bearer) assignment request message.

62. A method of communicating at a core network with a switching function, in a communication system including a user terminal, a plurality of base stations with cells serving as radio service areas, respectively, and base station control stations, the method comprising:
when sending a line assignment request message to said base station control station in response to a request from said user terminal present in said cells, also sending first information about a communication rate and second information indicating whether the communication rate is negotiable,
wherein the request is based on a requested type of communication service and a prestored table assigning communication rate negotiability to different types of communication services requested by the user terminal.

63. The method according to claim 62, wherein said first information includes a desired communication rate and said second information includes plural negotiable communication rates other than the desired communication rate.

64. A method of communicating at a base station control station in a communication system including a user terminal, a plurality of base stations with cells serving as radio service areas, respectively, the base station control stations, and a core network with a switching function, the method comprising:
receiving a line assignment request message to said base station control station from said core network in response to a request from the user terminal present in said cells, and
receiving first information about a communication rate and second information indicating whether the communication rate is negotiable from said core network when said base station control station receives the line assignment request message,
wherein the request is based on a requested type of communication service and a prestored table assigning communication rate negotiability to different types of communication services requested by the user terminal.

65. The method of claim 64, further comprising:
deciding communication rate information other than the first information corresponding to the type of communication service of said request when a lack of lines is determined and said second information indicates negotiable; and
returning said decided communication rate information together with a response message to said core network.

66. The method of claim 64, further comprising returning to said core network a response message indicating that said line assignment request is a failure, when a lack of lines is determined and when said second information indicates unnegotiable.

67. The method of claim 66, wherein said response message contains information indicating the lack of lines as the cause of the failure.

68. The method of claim 64,
wherein said first information includes a desired communication rate and said second information includes plural negotiable communication rates other than the desired communication rate.

69. The method of claim 68, further comprising returning a decided communication rate information together with a response message to said core network.

70. The method of claim 69, wherein said negotiable communication rates are rates in a predetermined range lower than said desired communication rate.

71. The method of claim 69, wherein said negotiable communication rates are a plurality of communication rates set in stages in said predetermined range.

72. The method of claim 68, wherein said negotiable communication rates are rates in a predetermined range lower than said desired communication rate.

73. The method of claim 68, further comprising returning to said core network a response message indicating that said line assignment request is a failure when a lack of lines is determined and when said line assignment request message does not contain said negotiable communication rates.

74. The method of claim 73, wherein said response message contains information indicating the lack of lines as the cause of the failure.

\* \* \* \* \*